(12) United States Patent
Park et al.

(10) Patent No.: US 8,031,566 B2
(45) Date of Patent: Oct. 4, 2011

(54) GAP SERVO CONTROL METHOD AND APPARATUS IN NEAR-FIELD OPTICAL DISC DRIVE

(75) Inventors: Young-jae Park, Yongin-si (KR);
Joong-gon Kim, Goyang-si (KR);
Noh-cheol Park, Seoul (KR);
Hyun-seok Yang, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 500 days.

(21) Appl. No.: 12/170,731

(22) Filed: Jul. 10, 2008

(65) Prior Publication Data

US 2009/0185306 A1 Jul. 23, 2009

(30) Foreign Application Priority Data

Jan. 18, 2008 (KR) .................. 10-2008-0005866

(51) Int. Cl.
*G11B 7/00* (2006.01)
(52) U.S. Cl. .............. 369/44.32; 369/47.47; 369/112.01
(58) Field of Classification Search .............. 369/13.33, 369/44.32, 44.35, 44.36, 47.17, 53.12, 53.13, 369/53.15, 53.18, 112.01, 112.08, 112.14
See application file for complete search history.

(56) References Cited

U.S. PATENT DOCUMENTS

| | | | | |
|---|---|---|---|---|
| 7,394,734 | B2* | 7/2008 | Ishimoto | 369/44.35 |
| 7,535,808 | B2* | 5/2009 | Ishimoto et al. | 369/53.22 |
| 7,755,986 | B2* | 7/2010 | Ishimoto | 369/44.23 |
| 2005/0180283 | A1 | 8/2005 | Ishimoto et al. | |
| 2007/0253312 | A1* | 11/2007 | Lee et al. | 369/112.23 |
| 2007/0297301 | A1* | 12/2007 | Verschuren | 369/44.32 |
| 2009/0245054 | A1* | 10/2009 | Verschuren | 369/53.11 |

FOREIGN PATENT DOCUMENTS

| | | |
|---|---|---|
| JP | 2002-316153 | 10/2002 |
| JP | 2005-259329 | 9/2005 |

OTHER PUBLICATIONS

International Search Report and Written Opinion issued in corresponding International Application No. PCT/KR2008/003851 dated Nov. 21, 2008.

* cited by examiner

*Primary Examiner* — Wayne Young
*Assistant Examiner* — Thomas Alunkal
(74) *Attorney, Agent, or Firm* — NSIP Law, PC

(57) ABSTRACT

A gap servo control method and apparatus for increasing a disturbance cancellation capability and decreasing the occurrence of an overshoot in a near-field optical disc drive include: generating an actuator driving signal of a transient response process by using a signal obtained by removing a disturbance contained in the gap error signal using a first band when a level of a gap error signal reaches a first level; and generating the actuator driving signal of the transient response process by using a signal obtained by removing the disturbance contained in the gap error signal using a second band when the level of the gap error signal reaches a second level.

26 Claims, 8 Drawing Sheets

GAP SERVO CONTROL METHOD AND APPARATUS IN NEAR-FIELD OPTICAL DISC DRIVE

CROSS-REFERENCE TO RELATED APPLICATION

This application claims the benefit of Korean Patent Application No. 2008-5866 filed on Jan. 18, 2008, in the Korean Intellectual Property Office, the disclosure of which is incorporated herein by reference.

BACKGROUND OF THE INVENTION

1. Field of the Invention

Aspects of the present invention relate to servo control in an optical disc drive, and more particularly, to a gap servo control method and apparatus in a near-field optical disc drive.

2. Description of the Related Art

Recently, near-field optical disc drives that achieve a large disc capacity and a high data transfer rate (DTR) have been suggested. Such a near-field optical disc drive is called a near-field recording and reproducing system. A near-field optical disc drive is a device that records and reproduces data to and from a disc by using light in a near-field in which diffraction of the light does not occur.

Such a near-field optical disc drive records and reproduces a large amount of information by recording and reproducing an information cell within hundredths of an angstrom (Å) unit using near-field optical technology and ultra microelectromechanical system (MEMS) technology. That is, by using a near-field optical disc drive, data of more than 20 Gigabytes, which is the amount of image data for a high definition television (HDTV) class that can be recorded with an image quality of MPEG-2 for more than 2 hours, can be recorded and reproduced to and from one surface of a disc having a 3-cm diameter; thus, a large amount of data can be recorded and reproduced from a microminiaturized disc.

Such a near-field optical disc drive includes a pickup having nanoscale precision and a gap servo control apparatus to control the pickup. The pickup is called an optical head unit. The pickup includes an objective lens and a solid immersion lens (SIL). The pickup concentrates light on a disc by maintaining a focus distance within tens of nm from the disc so that an optical spot concentrated on the disc becomes microsized. Thus, in recording, the near-field optical disc drive can record a large amount of information to the disc. In reproduction, like the recording, the near-field optical disc drive reproduces information by the pick up receiving reflective light while maintaining a focus distance within tens of nm from the disc and performing optoelectric conversion of the received reflective light.

The gap servo control apparatus controls the pickup so that the pickup can constantly maintain the distance within the tenths of a nm gap with the disc surface. In order to constantly maintain the tenths of a nm gap, the gap servo control apparatus must control the pickup to react to disturbances of the disc in the near-field. In order to control the pickup to react to disturbances of the disc, the gap servo control apparatus may increase a loop gain of a feedback controller.

However, when the gap servo control apparatus increases the loop gain of the feedback controller, a servo bandwidth increases; and therefore, the gap servo control apparatus may be sensitive to disc scratches, contamination, and electrical noise, thereby increasing the occurrence of an overshoot during pull-in of the pickup. Since the gap that must be maintained between the pickup and the disc surface is very small, such as tenths of a nm, if an overshoot occurs when an open loop state is changed to a closed loop state in the pull-in of the pickup, the possibility of a collision of the SIL and the disc is very high. Thus, since the conventional gap servo control apparatus is limited to an increase in feedback loop gain, it is difficult to ensure a sufficient disturbance cancellation capability.

SUMMARY OF THE INVENTION

Aspects of the present invention provide a gap servo control method and apparatus for increasing a disturbance cancellation capability and decreasing the occurrence of an overshoot in a gap pull-in of a lens in a near-field optical disc drive.

According to an aspect of the present invention, there is provided a gap servo control method in a near-field optical disc drive, the gap servo control method comprising: generating an actuator driving signal in a transient response process by removing a disturbance contained in a gap error signal using a first band when a level of the gap error signal reaches a first level; and generating the actuator driving signal of the transient response process by removing the disturbance contained in the gap error signal using a second band when the level of the gap error signal reaches a second level.

According to aspects of the present invention, the first band may be a rotation of a disc in the near-field optical disc drive, and the second band may be n times the rotation band.

According to aspects of the present invention, the generating of the actuator driving signal using the first band may comprise generating the actuator driving signal so that the gap error signal approaches the second level, the generating of the actuator driving signal using the second band may comprise generating the actuator driving signal so that the gap error signal approaches a target level, and when the gap error signal reaches the target level, a gap servo control may be changed from the transient response process to a normal process to maintain the target level.

According to aspects of the present invention, the actuator driving signal from the first level to the second level and the actuator driving signal from the second level to the target level may have be a linear pattern or a step.

According to another aspect of the present invention, there is provided a gap servo control apparatus in a near-field optical disc drive, the gap servo control apparatus comprising: an approach controller to output a signal for performing an approach process in a pull-in until a level of a gap error signal reaches a first level; a feedback controller to output a signal for performing a transient response process and a normal process in the gap pull-in after the level of the gap error signal reaches the first level; a first disturbance observer to output a first signal to cancel a disturbance contained in the gap error signal using a first band when the level of the gap error signal reaches the first level; a second disturbance observer to output a second signal to cancel the disturbance contained in the gap error signal using a second band when the level of the gap error signal reaches the second level; a first adder to add the output signal of the feedback controller to at least one of output signals of the first disturbance observer and the second disturbance observer; a second adder to add an output signal of the approach controller to an output signal of the first adder and to output the addition result as an actuator driving signal; and a controller to control the approach controller, the feedback controller, the first disturbance observer, and the second disturbance observer according to the level of the gap error signal to drive a lens of the near-field optical disc drive to record and/or reproduce data on a disc in the near-field optical disc drive.

According to aspects of the present invention, the second band may have a greater value than the first band.

According to aspects of the present invention, the second level may exist between the first level and the target level.

According to aspects of the present invention, the first disturbance observer may cancel the disturbance of the gap error signal by filtering the gap error signal and the actuator driving signal using the first band, and the second disturbance observer may cancel the disturbance of the gap error signal by filtering the gap error signal and the actuator driving signal using the second band.

According to another aspect of the present invention, there is provided a gap servo control apparatus in a near-field optical disc drive, the gap servo control apparatus comprising: an approach controller to output a signal for performing an approach process in a pull-in; a feedback controller to output a signal for performing a transient response process and a normal process in the pull-in; a first switch for transmitting a gap error signal to one of the approach controller and the feedback controller; a first disturbance observer to output a signal to cancel a disturbance contained in the gap error signal using a first band; a second disturbance observer to output a signal to cancel the disturbance contained in the gap error signal using a second band; a second switch to output a signal of at least one of the output signal of the first disturbance observer and the output signal of the second disturbance observer; a controller to control operations of the first switch and the second switch according to a level of the gap error signal; a first adder to add the output signal of the feedback controller to the output signal of the second switch; and a second adder to add the output signal of the approach controller to the output signal of the first adder and to output the addition result as an actuator driving signal.

According to aspects of the present invention, when the level of the gap error signal reaches a first level, the controller may control the first switch so that the gap error signal is transmitted to the feedback controller and control the second switch so that the output signal of the first disturbance observer is transmitted to the first adder, and when the level of the gap error signal reaches a second level, the controller may control the first switch so that the gap error signal is transmitted to the feedback controller and controls the second switch so that the output signal of the second disturbance observer is transmitted to the first adder.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a waveform diagram of output signals of some functional blocks illustrated in FIG. 1 in pull-in;

FIG. 4 is a relational diagram of a gap error signal (GES), an output signal of the first disturbance observer, and an output signal of the second disturbance observer in a transient response process in the pull-in;

FIG. 6 is a waveform diagram of functional blocks illustrated in FIG. 5 in pull-in;

DETAILED DESCRIPTION OF THE EMBODIMENTS

Figure 1:
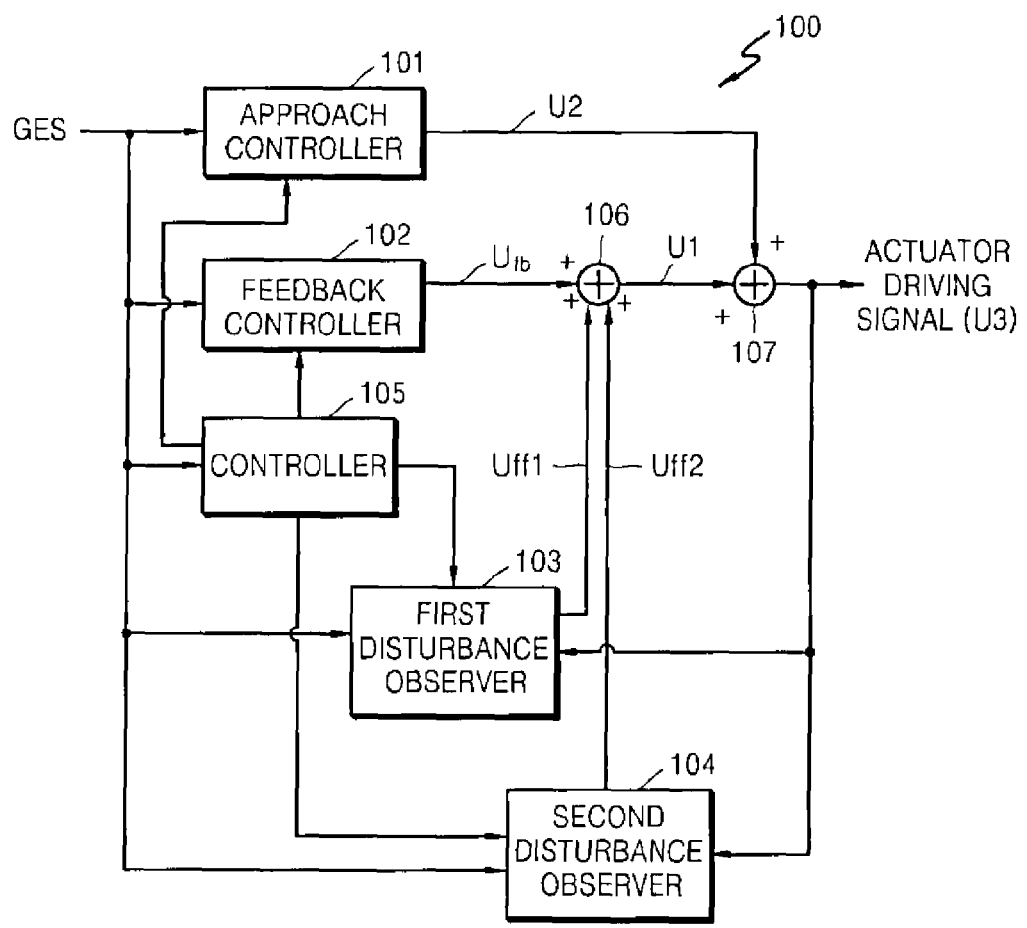
FIG. 1 is a block diagram of a gap servo control apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

Aspects of the present invention provide a gap servo control method and apparatus for increasing a disc disturbance following capability and reducing the occurrence of an overshoot in a transient response process in pull-in of a near-field optical disc drive by using multiple disturbance observers. In particular, aspects of the present invention provide a gap servo control method and apparatus for driving an actuator by using a signal obtained by a disturbance observer operated within a first band corresponding to a rotation band of a disc when an approach process is changed to the transient response process in the pull-in of the pickup and driving the actuator by using a signal obtained by a disturbance observer operated within a second band equal to n times the rotation band (i.e., n times the first band) before the transient response process is changed to a target process in the pull-in of the pickup.

In addition, in the embodiments of the present invention, a gap servo control process in the pull-in will be divided into an approach process, a transient response process, and a normal process. The approach process is a process of operating the gap servo control in an open-loop state (or an open-loop control state), in which an objective lens is close to a near-field area, by applying a linear voltage (e.g., a ramp voltage) to an actuator included in a near-field optical disc drive. The transient response process is called a handover process. The transient response process is a process in which the objective lens is moved to a target position (or a target level) while changing a level of a gap error signal within a near-field gap range in order to prevent collision of a solid immersion lens (SIL) and a disc due to instability of the objective lens because of an overshoot when the gap servo control is changed from an open-loop state to a closed-loop state (or a closed-loop control state). A target position of the gap error signal can be a target gap distance. The target gap distance is a distance whereby a distance between the objective lens and a disc satisfies a near-field condition. The normal process is a process in which a voltage is provided to the actuator so that the objective lens reacts to a disturbance of the disk in the target position and is the same as a focusing servo process. In the transient response process and the normal process, the gap servo control is operated in the closed-loop state.

Figure 2:
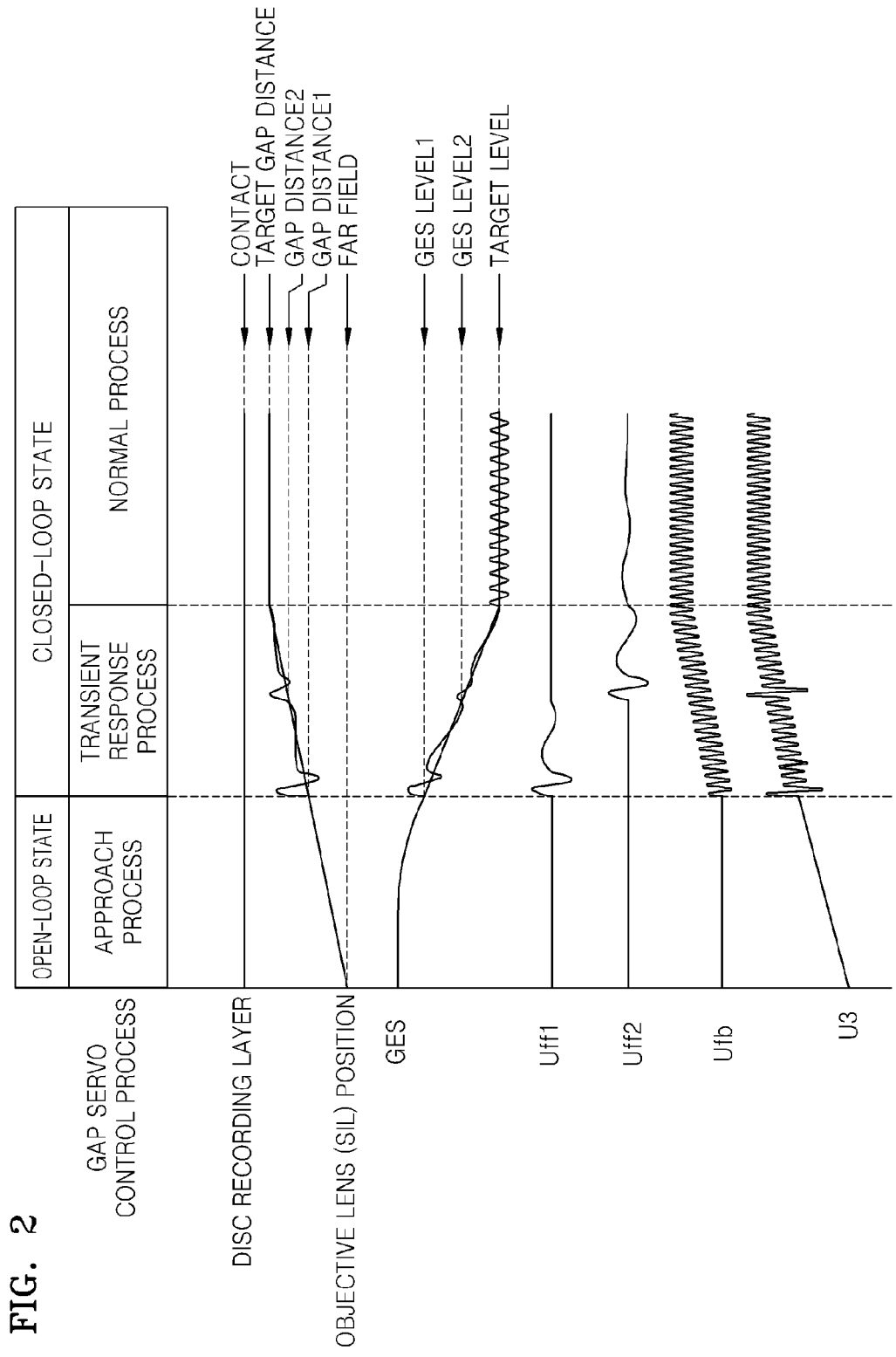

FIG. 1 is a block diagram of a gap servo control apparatus 100 according to an embodiment of the present invention. FIG. 2 is a waveform diagram of output signals of some functional blocks illustrated in FIG. 1 in the pull-in. Referring to FIG. 1, the gap servo control apparatus 100 includes an approach controller 101, a feedback controller 102, a first disturbance observer 103, a second disturbance observer 104, a controller 105, a first adder 106, and a second adder 107.

If a gap error signal (GES) is input, the approach controller 101 outputs a signal U2 for performing the approach process in the pull-in. That is, in the pull-in, if the GES is detected when an objective lens (not shown) included in a near-field optical disc drive is operated on a disc recording layer as illustrated in FIG. 2, the approach controller 101 outputs the linear signal U2 until the GES reaches a first level (GES level 1). The output linear signal U2 has the same slope as that in the approach process of an actuator driving signal U3, which is output by the gap servo control apparatus 100, illustrated in FIG. 2 and can be called a ramp signal. When the approach controller 101 operates, the gap servo control apparatus 100 is set to the open-loop state.

The feedback controller 102 outputs a signal Ufb for performing the transient response process and the normal process in the pull-in. That is, in the transient response process, the feedback controller 102 forms a closed loop by feeding the GES back so that the GES follows a reference level. If the signal Ufb output from the feedback controller 102 shows a linear pattern, the reference level that the feedback controller 102 must follow is continuously and linearly changed (or increased) until the GES reaches a target level. If the signal Ufb output from the feedback controller 102 shows a step (or staircase) pattern, the reference level that the feedback controller 102 must follow has the step pattern (or increases in the step pattern), such that a level of the GES is changed from the first level (GES level 1) to a second level (GES level 2) and from the second level (GES level 2) to the target level in the step pattern. The signal Ufb output from the feedback controller 102, which is illustrated in FIG. 2, corresponds to a case where the reference level is continuously changed so that the GES follows the reference level. In the normal process, the feedback controller 102 does not change the reference level. In this case, the reference level is the target level. Thus, as illustrated in FIG. 2, the feedback controller 102 continuously operates even after the GES reaches the first level (GES level 1).

The feedback controller 102 can be called a servo filter operation unit because the feedback controller 102 can be implemented with a lead-lag compensator based on a lead compensator acting as a high-pass filter (HPF) and a lag compensator acting as a low-pass filter (LPF).

The first disturbance observer 103 outputs a signal Uff1 obtained by canceling a disturbance contained in the GES using a first band when the approach process is changed to the transient response process (or the level of the GES is the first level (GES level 1) as illustrated in FIG. 2). For the first band, a rotation band of a disc, for example, can be set. The rotation band of a disc may be, for example, 60 Hz. Thus, the first disturbance observer 103 can reduce the occurrence of an overshoot when the approach process is changed to the transient response process by removing a harmonic frequency of disturbance contained in the GES and suppressing the GES so as to not excessively respond to noise.

Figure 3:
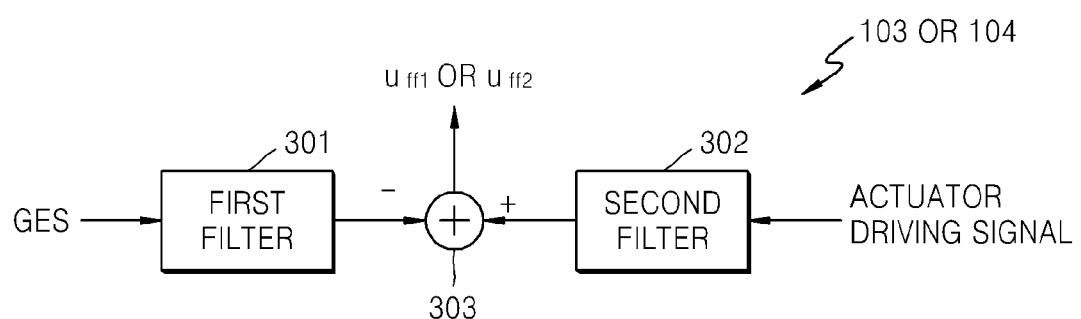
FIG. 3 is a block diagram of a first disturbance observer or a second disturbance observer according to an embodiment of the present invention.
Figure 4:
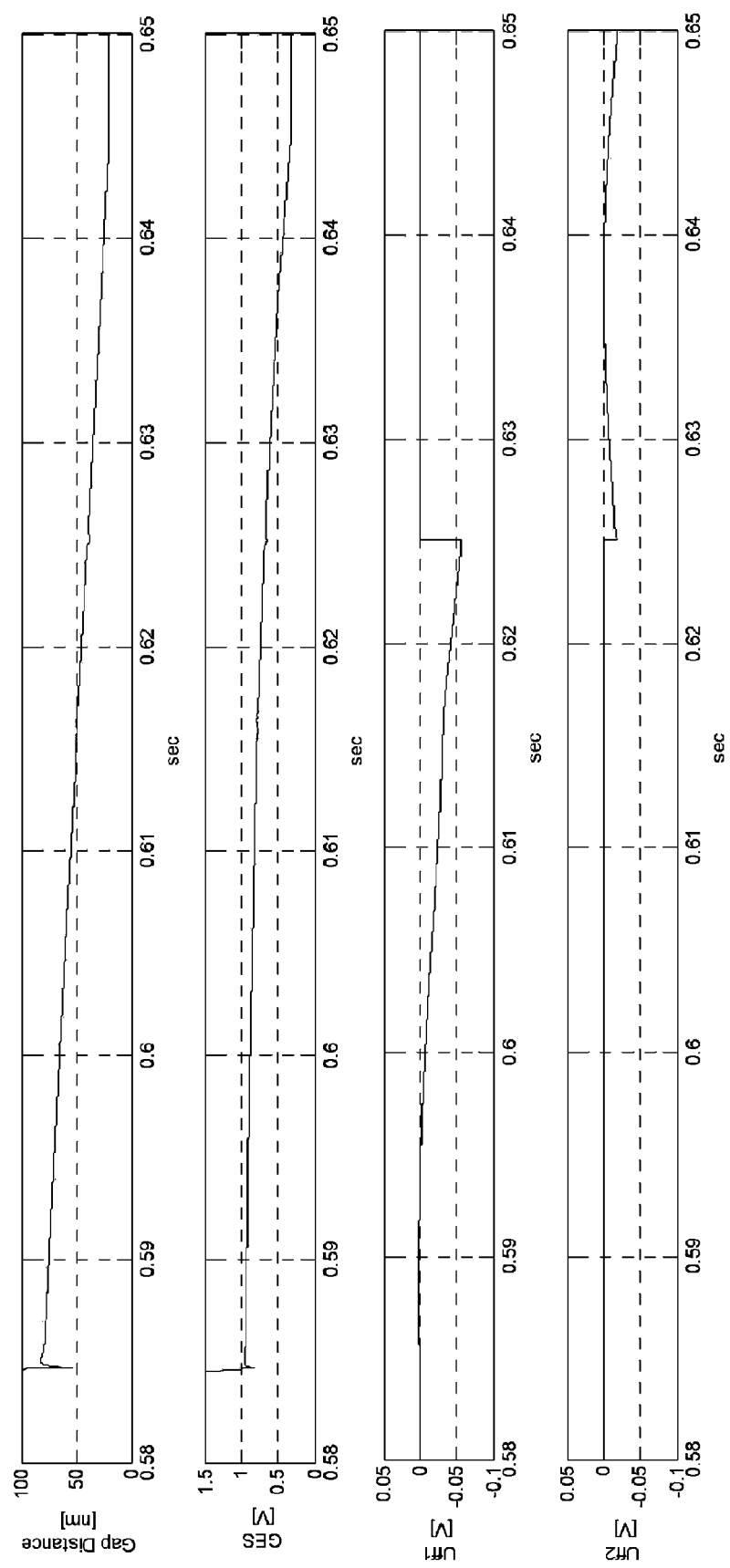

The first disturbance observer 103 can cancel the disturbance contained in the GES by filtering the GES and the output signal U3 of the gap servo control apparatus 100 using the first band. That is, the first disturbance observer 103 can include a first filter 301, a second filter 302, and an adder 303 as illustrated in FIG. 3. FIG. 3 is a block diagram of the first disturbance observer 103 or the second disturbance observer 104 according to an embodiment of the present invention. Referring to FIG. 3, the first filter 301 removes the harmonic frequency and noise contained in the GES by filtering the GES using the first band. The second filter 302 removes a harmonic frequency and noise contained in the actuator driving signal U3 of the gap servo control apparatus 100. The first filter 301 and the second filter 302 can be formed with an LPF. The adder 303 detects a difference between the first filter 301 and the second filter 302 and outputs the difference as the output signal Uff1 of the first disturbance observer 103. In the transient response process, when the GES is the same as illustrated in FIG. 4, the output signal Uff1 of the first disturbance observer 103 can be the same as illustrated in FIG. 4. FIG. 4 is a relational diagram of the GES, the output signal Uff1 of the first disturbance observer 103, and an output signal Uff2 of the second disturbance observer 104 in the transient response process in the pull-in.

Referring back to FIG. 1, the second disturbance observer 104 cancels the disturbance contained in the GES using a second band when the level of the GES reaches the second level (GES level 2). Accordingly, the signal Uff2 output from the second disturbance observer 104 can be the same as illustrated in FIG. 2. The second band is n times the first band. For example, n can be set as one of 3, 4, and 5 but is not limited thereto. Thus, the second disturbance observer 104 removes a disturbance harmonic frequency of a higher order than that removed by the first disturbance observer 103. The second disturbance observer 104 can be formed similar to the first disturbance observer 103. The second disturbance observer 104 is used to decrease a residue error in the normal process by continuously operating after the level of the GES reaches the second level (GES level 2) in the transient response process. When the GES in the transient response process is the same as illustrated in FIG. 4, the signal Uff2 output from the second disturbance observer 104 can be the same as illustrated in FIG. 4. Although described herein as first and second disturbance observers 103 and 104, the first and second disturbance observers 103 and 104 may be combined into one disturbance observer or may include other disturbance observers according to aspects of the present invention. Further, each band may be a frequency or a range of frequencies, and aspects of the present invention provide for more than two bands.

The controller 105 monitors the level of the GES when a gap servo pull-in command is input and controls the approach controller 101, the feedback controller 102, the first disturbance observer 103, and the second disturbance observer 104 according to the monitoring result. That is, the controller 105 controls the approach controller 101 to operate until the GES reaches the first level (GES level 1). When the level of the GES reaches the first level (GES level 1), the controller 105 controls the feedback controller 102 and the first disturbance observer 103 to operate. If the level of the GES reaches the second level (GES level 2), the controller 105 controls the feedback controller 102, the first disturbance observer 103, and the second disturbance observer 104 to operate. However, aspects of the present invention are not limited thereto such that the controller 105 may control the feedback controller 102 and the second disturbance observer 104 to operate as the level of the GES reaches the second level (GES level 2). Further, although described herein as including the first level (GES level 1), the second level (GES level 2), and the target level, aspects of the present invention are not limited thereto such that there may be more or fewer levels of the included therein.

The first adder 106 outputs a signal U1 obtained by adding the output signal Ufb of the feedback controller 102 to at least one of the output signals Uff1 and Uff2 of the first disturbance observer 103 and the second disturbance observer 104.

The second adder 107 outputs the actuator driving signal U3 obtained by adding the output signal U2 of the approach controller 101 to the output signal U1 of the first adder 106. The actuator driving signal U3 is illustrated in FIG. 2.

Figure 5:
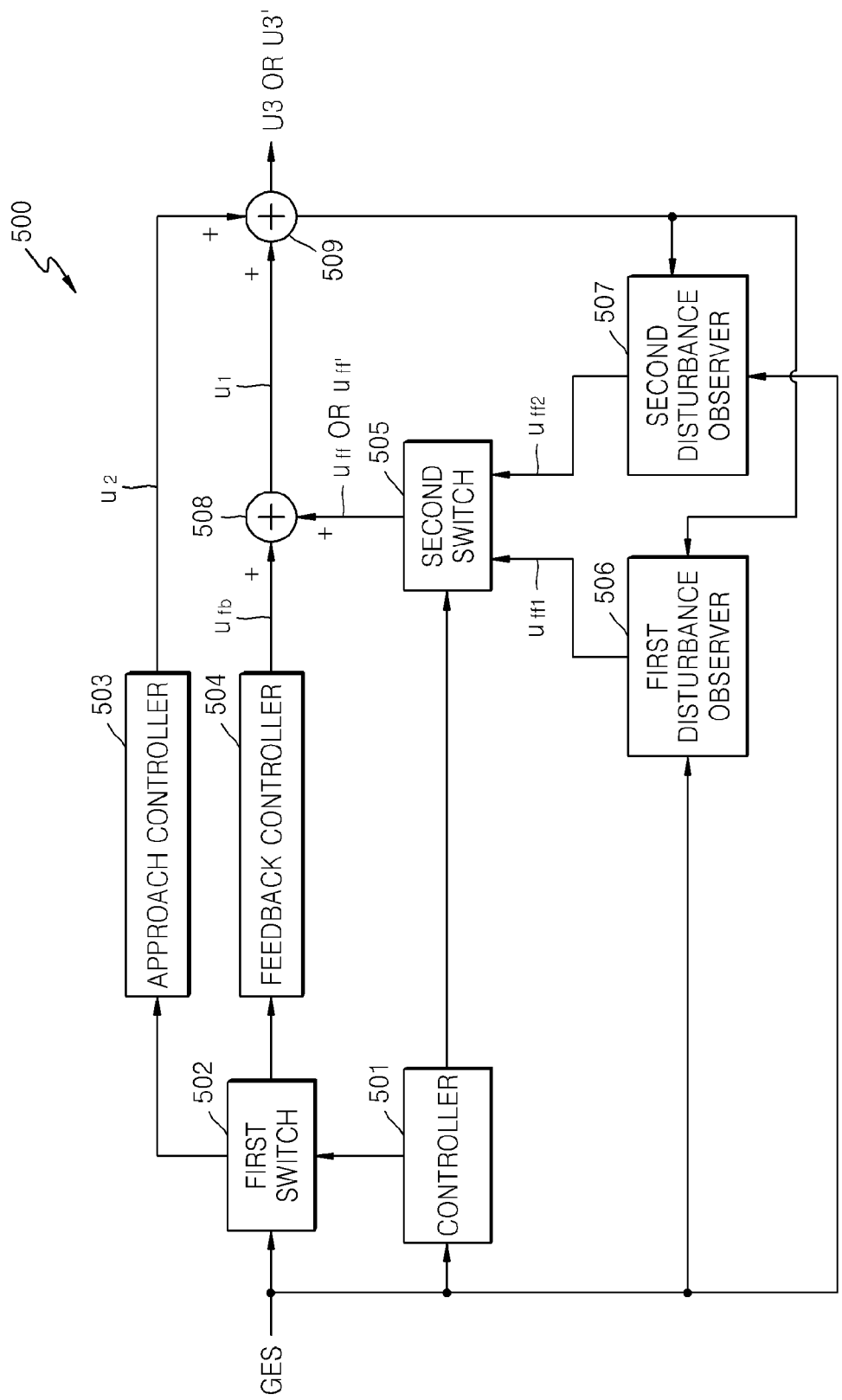
FIG. 5 is a block diagram of a gap servo control apparatus according to another embodiment of the present invention.
Figure 6:
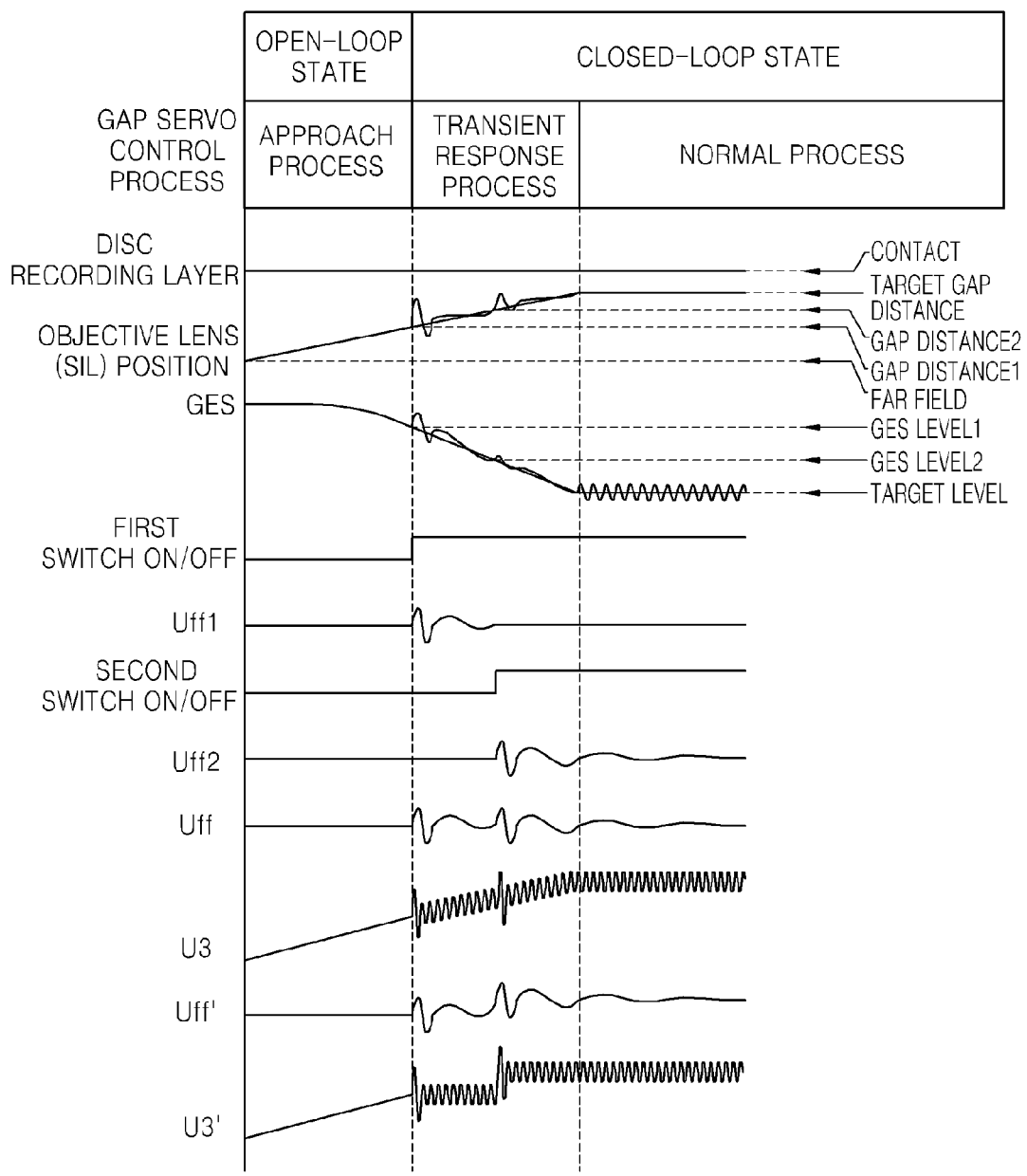

FIG. 5 is a block diagram of a gap servo control apparatus 500 according to another embodiment of the present invention. FIG. 6 is a waveform diagram of functional blocks illustrated in FIG. 5. Referring to FIG. 5, the gap servo control apparatus 500 includes a controller 501, a first switch 502, an approach controller 503, a feedback controller 504, a second switch 505, a first disturbance observer 506, a second disturbance observer 507, a first adder 508, and a second adder 509.

The approach controller 503, the feedback controller 504, the first disturbance observer 506, the second disturbance observer 507, the first adder 508, and the second adder 509 illustrated in FIG. 5 are formed and operate similarly to the approach controller 101, the feedback controller 102, the first disturbance observer 103, the second disturbance observer 104, the first adder 106, and the second adder 107 illustrated in FIG. 1, respectively. However, unlike those illustrated in FIG. 1, the approach controller 503, the feedback controller 504, the first disturbance observer 506, and the second disturbance observer 507 illustrated in FIG. 5 are not directly controlled by the controller 501.

Like as illustrated in FIG. 1, in FIG. 5, the controller 501 monitors the level of the GES if the gap servo pull-in command is input and controls the first switch 502 and the second switch 505 according to the monitoring result. That is, as illustrated in FIG. 6, the controller 501 controls the first switch 502 so that the GES is transmitted to the approach controller 503 until the level of the GES reaches the first level (GES level 1). Accordingly, the actuator driving signal U3 of the second adder 509 becomes the output signal U2 of the approach controller 503. Thus, since the actuator driving signal U3 in the approach process corresponds to U2 in the waveform diagram of FIG. 6, FIG. 6 indicates that the output signal U2 of the approach controller 503 is output in the linear pattern as illustrated in FIG. 2.

As illustrated in FIG. 6, when the level of the GES reaches the first level (GES level 1), the controller 501 controls the first switch 502 so that the GES is transmitted to the feedback controller 504 and controls the second switch 505 so that the output signal Uff1 of the first disturbance observer 506 is transmitted to the first adder 508. Accordingly, the output signal U1 of the first adder 508, which equals a signal Uff from the second switch 505 added to the output signal Ufb of the feedback controller, becomes Ufb+Uff1, and the actuator driving signal U3 of the second adder 509 also becomes Ufb+Uff1, i.e., Uff=Uff1.

As illustrated in FIG. 6, when the level of the GES reaches the second level (GES level 2), the controller 501 controls the first switch 502 so that the GES is transmitted to the feedback controller 504 and controls the second switch 505 so that the output signal Uff2 of the second disturbance observer 507 is transmitted to the first adder 508. Accordingly, the output signal U1 of the first adder 508, which equals the signal Uff from the second switch 505 added to the output signal Ufb of the feedback controller, becomes Ufb+Uff2, and the actuator driving signal U3 of the second adder 509 also becomes Ufb+Uff2, i.e., Uff=Uff2.

When the level of the GES reaches the target level, the controller 501 controls the first switch 502 and the second switch 505 to keep the same operational state as the level of the GES reaches the second level (GES level 2). Accordingly, the output signal U1 of the first adder 508 becomes Ufb+Uff2, and the actuator driving signal U3 of the second adder 509 also becomes Ufb+Uff2, i.e., Uff=Uff2.

If the output signal Ufb of the feedback controller 504 has the step (or staircase) pattern, the reference level of the feedback controller 504 is changed from the first level (GES level 1) to the second level (GES level 2) and from the second level (GES level 2) to the target level as illustrated in FIG. 6. In FIG. 6, an output signal Ufb' (not shown) of the feedback controller 504 has the step (or staircase) pattern. When the output signal Ufb' (not shown) of the feedback controller 504 is output, an actuator driving signal U3' is output by the second adder 509 as indicated by the actuator driving signal U3' of FIG. 6. Specifically, the output signal Uff' from the second switch 505 is at least one of the output signal Uff1' (not shown) from the first disturbance observer 506 and the output signal Uff2' (not shown) from the second disturbance observer 507. The first adder 508 adds the output signal Ufb' (not shown) from the feedback controller 504 to the output signal Uff' from the second switch 505 and the second adder 509 outputs the actuator driving signal U3' having a step form and which is the sum of the output signals Uff' and Ufb' (not shown).

Figure 7:
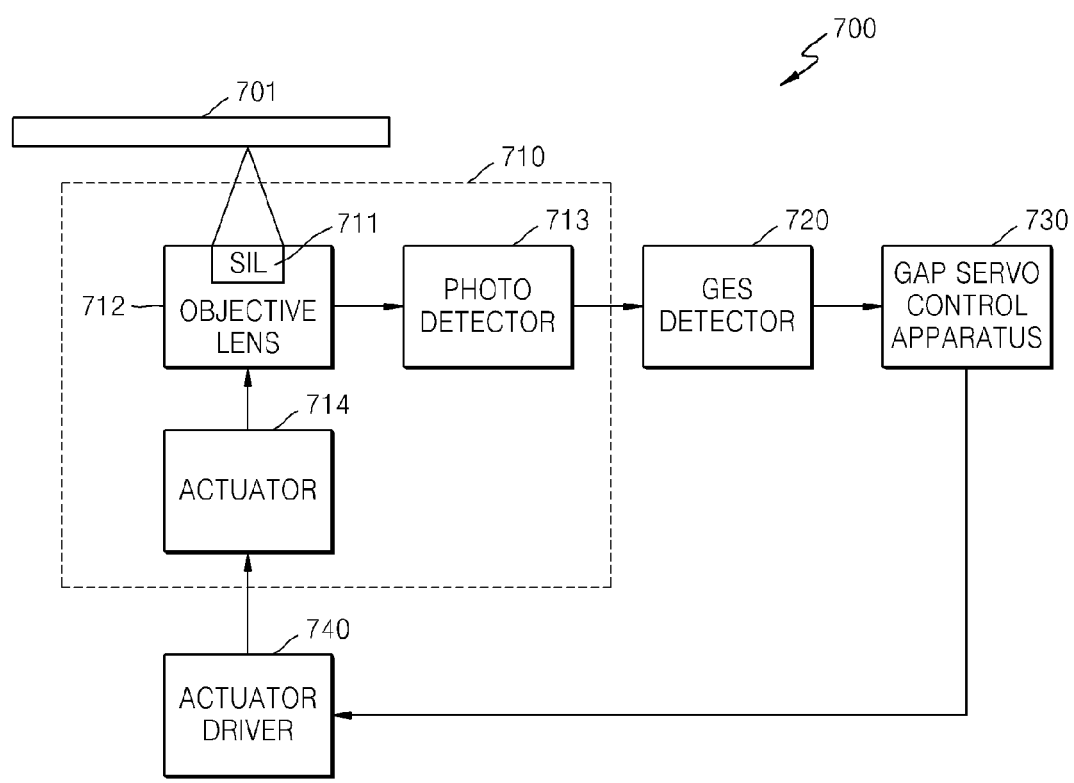
FIG. 7 is a schematic block diagram of a near-field optical disc drive to which a gap servo control apparatus according to an embodiment of the present invention is applied.

FIG. 7 is a schematic block diagram of a near-field optical disc drive 700 to which a gap servo control apparatus according to an embodiment of the present invention is applied. Referring to FIG. 7, the near-field optical disc drive 700 includes a loaded disc 701, a pickup 710, a GES detector 720, a gap servo control apparatus 730 according to an embodiment of the present invention, and an actuator driver 740.

The pickup 710 includes an objective lens 712 and an SIL 711 to concentrate light on a recording layer of the disc 701 in a near field to record and/or reproduce data to/from the recording layer, a photodetector 713 to detect light reflected from the disc 701 via the objective lens 712, and an actuator 714 to move the objective lens 712 in a focusing direction.

The GES detector 720 detects a GES according to a signal output from the photo detector 713. The gap servo control apparatus 730 outputs an actuator driving signal as illustrated in FIG. 1 or 5 to the actuator driver 740. The actuator driver 740 drives the actuator 714 according to the actuator driving signal output from the gap servo control apparatus 730.

Figure 8:
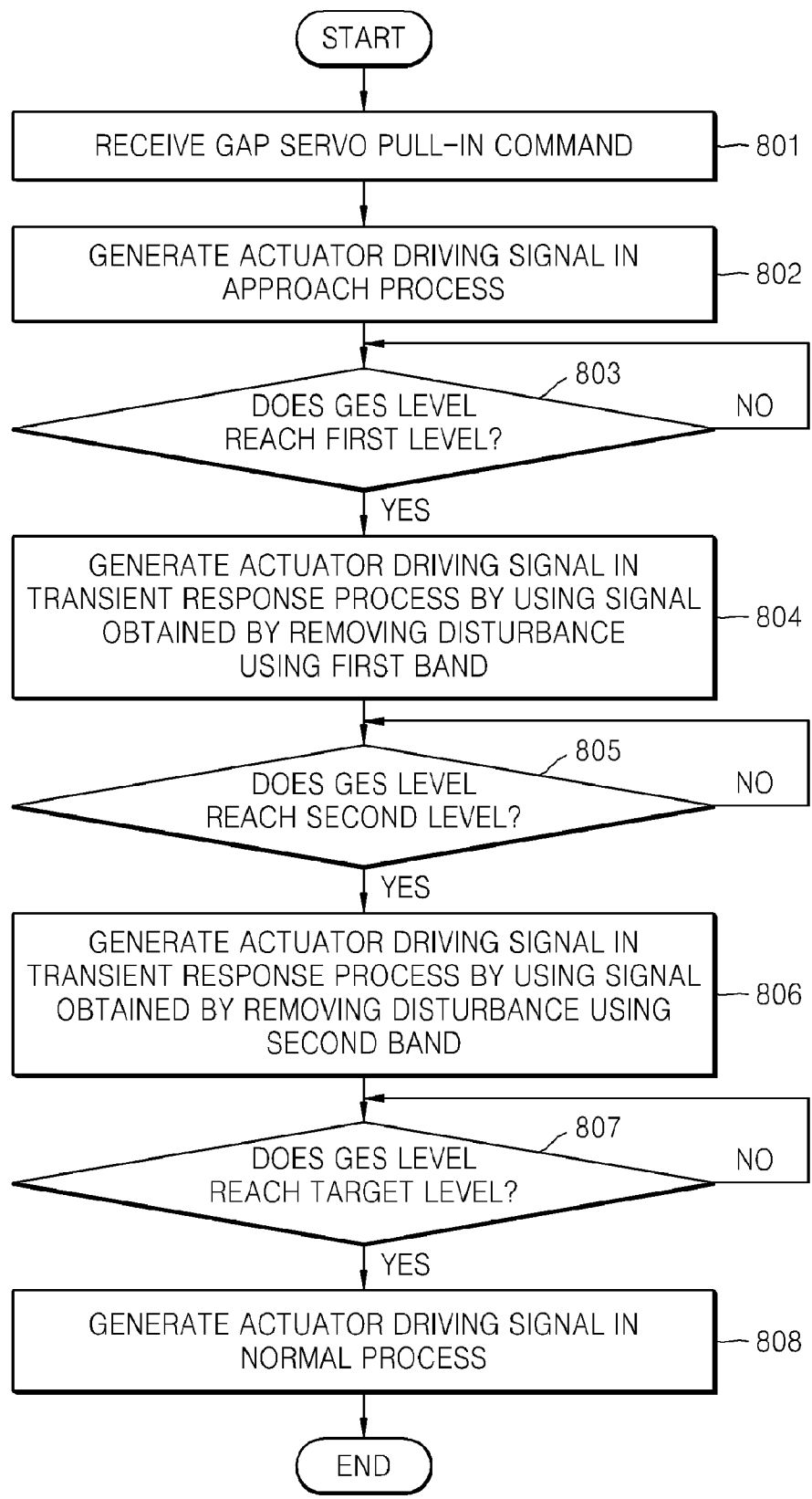
FIG. 8 is a flowchart illustrating a gap servo control method according to an embodiment of the present invention.

FIG. 8 is a flowchart illustrating a gap servo control method according to an embodiment of the present invention. Referring to FIG. 8, when a gap servo pull-in command is input in operation 801, an actuator driving signal in an approach process is generated in operation 802. That is, the approach controller 101 illustrated in FIG. 1 or the approach controller 503 illustrated in FIG. 5 generates an actuator driving signal in the approach process using a detected GES and the second adder 107 and 509 applies the output signal U2 from the approach controller 101 and 503 to the actuator driver 740.

If it is determined in operation 803 that a level of a GES reaches a first level, an actuator driving signal in a transient response process is generated in operation 804 by using a signal obtained by canceling a disturbance of the GES using a first band. To generate the actuator driving signal using the first band is to generate the actuator driving signal so that the GES approaches a second level. The first level is the same as the first level (GES level 1) illustrated in FIG. 2 or 6. The signal obtained by canceling the disturbance of the GES using the first band is the same as the output signal Uff1 of the first disturbance observer 103 or 506 illustrated in FIG. 1 or 5, respectively.

If it is determined in operation 805 that the level of the GES reaches the second level, an actuator driving signal in the transient response process is generated in operation 806 by using a signal obtained by canceling a disturbance of the GES using a second band. The second level is the same as the second level (GES level 2) illustrated in FIG. 2 or 6. The signal obtained by canceling the disturbance of the GES using the second band is the same as the output signal Uff2 of the second disturbance observer 104 or 507 illustrated in FIG. 1 or 5, respectively. A relationship of the first band and the second band is the same as described with FIG. 1. To generate the actuator driving signal using the second band is to generate the actuator driving signal so that the GES approaches a target level.

If it is determined in operation 807 that the level of the GES reaches the target level, an actuator driving signal in a normal process is generated in operation 808 by changing the transient response process to the normal process. The actuator driving signal generated in the normal process is generated by using the signal obtained by canceling the disturbance of the GES using the second band. Accordingly, a residue error in the normal process can be reduced.

The actuator driving signal generated in FIG. 8 can have the linear pattern or the step pattern as described above and illustrated in FIG. 6, but is not limited thereto in all aspects.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion.

As described above, according to aspects of the present invention, by operating a gap servo control apparatus using double disturbance observers in a near-field optical disc drive, the possibility of collision of an SIL and a disc is reduced by reducing the occurrence of an overshoot when an open-loop state (an approach process) is changed to a closed-loop state (a transient response process) in pull-in (or gap servo pull-in), and the possibility of collision of the SIL and the disc is reduced in a normal process in the pull-in by increasing a disc disturbance following capability before a level of a gap error signal reaches a target level (or a target gap distance) by changing filtering bands of the disturbance observers in the transient response process in the pull-in, and thus system stability can be increased.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A gap servo control method in a near-field optical disc drive, the gap servo control method comprising:
generating an actuator driving signal in a transient response process by removing a disturbance contained in a gap error signal using a first band, when a level of the gap error signal reaches a first level; and
generating the actuator driving signal of the transient response process by removing the disturbance contained in the gap error signal using a second band other than the first band, when the level of the gap error signal reaches a second level.

2. The gap servo control method of claim 1, wherein the second band is greater than the first band.

3. The gap servo control method of claim 1, wherein the second band is n times the first band.

4. The gap servo control method of claim 2, wherein the first band is a rotation band of a disc in the near-field optical disc drive; and the second band is n times the rotation band.

5. The gap servo control method of claim 2, wherein the generating of the actuator driving signal using the first band comprises generating the actuator driving signal so that the gap error signal approaches the second level;
the generating of the actuator driving signal using the second band comprises generating the actuator driving signal so that the gap error signal approaches a target level; and
when the gap error signal reaches the target level, a gap servo control is changed from the transient response process to a normal process to maintain the target level.

6. The gap servo control method of claim 5, wherein the actuator driving signal is a linear signal.

7. The gap servo control method of claim 5, wherein the actuator driving signal is a step signal.

8. The gap servo control method of claim 1, wherein the second band is a harmonic of the first band.

9. A gap servo control apparatus in a near-field optical disc drive, the gap servo control apparatus comprising:
an approach controller to output a signal for performing an approach process in a pull-in until a level of a gap error signal reaches a first level;
a feedback controller to output a signal for performing a transient response process, and for performing a normal process in the gap pull-in after the level of the gap error signal reaches the first level;
a first disturbance observer to output a first signal to cancel a disturbance contained in the gap error signal using a first band when the level of the gap error signal reaches the first level;
a second disturbance observer to output a second signal to cancel the disturbance contained in the gap error signal using a second band when the level of the gap error signal reaches the second level;
a first adder to add the output signal of the feedback controller to at least one of the first signal of the first disturbance observer and the second signal of the second disturbance observer;
a second adder to add the output signal of the approach controller to an output signal of the first adder and to output the addition result as an actuator driving signal; and
a controller to control the approach controller, the feedback controller, the first disturbance observer, and the second disturbance observer according to the level of the gap error signal to drive a lens of the near-field optical disc drive to record and/or reproduce data on a disc in the near-field optical disc drive.

10. The gap servo control apparatus of claim 9, wherein the second band is greater than the first band.

11. The gap servo control apparatus of claim 10, wherein the second band is n times the first band.

12. The gap servo control apparatus of claim 11, wherein the first band is a rotation band of a disc in the near-field optical disc drive; and
the second band is n times the rotation band.

13. The gap servo control apparatus of claim 12, wherein n is a natural number equal to or greater than 3.

14. The gap servo control apparatus of claim 10, wherein the second level is between the first level and a target level.

15. The gap servo control apparatus of claim 10, wherein the first disturbance observer cancels the disturbance of the gap error signal by filtering the gap error signal and the actuator driving signal using the first band; and the second disturbance observer cancels the disturbance of the gap error signal by filtering the gap error signal and the actuator driving signal using the second band.

16. A gap servo control apparatus in a near-field optical disc drive, the gap servo control apparatus comprising:
an approach controller to output a signal for performing an approach process in a pull-in;
a feedback controller to output a signal for performing a transient response process and a normal process in the pull-in;
a first switch to transmit a gap error signal to one of the approach controller and the feedback controller;
a first disturbance observer to output a signal to cancel a disturbance contained in a gap error signal using a first band;
a second disturbance observer to output a signal to cancel the disturbance contained in the gap error signal using a second band;
a second switch to output a signal of at least one of the output signal of the first disturbance observer and the output signal of the second disturbance observer;
a controller to control operations of the first switch and the second switch according to a level of the gap error signal;
a first adder to add the output signal of the feedback controller to the output signal of the second switch; and
a second adder to add the output signal of the approach controller to the output signal of the first adder and to output the addition result as an actuator driving signal to drive a lens of the near-field optical disc drive to record and/or reproduce data on a disc in the near-field optical disc drive.

17. The gap servo control apparatus of claim 16, wherein when the level of the gap error signal reaches a first level, the controller controls the first switch so that the gap error signal is transmitted to the feedback controller, and controls the second switch so that the output signal of the first disturbance observer is transmitted to the first adder; and
when the level of the gap error signal reaches a second level, the controller controls the first switch so that the gap error signal is transmitted to the feedback controller, and controls the second switch so that the output signal of the second disturbance observer is transmitted to the first adder.

18. The gap servo control apparatus of claim 17, wherein the first band is a rotation band of a disc in the near-field optical disc drive; and
the second band is n times the rotation band.

19. The gap servo control apparatus of claim 18, wherein n is a natural number equal to or greater than 3.

20. The gap servo control apparatus of claim 18, wherein the first disturbance observer cancels the disturbance of the gap error signal by filtering the gap error signal and the actuator driving signal using the first band; and the second disturbance observer cancels the disturbance of the gap error signal by filtering the gap error signal and the actuator driving signal using the second band.

21. A gap servo control apparatus, comprising:
a feedback controller to output a feedback signal for performing a transient response process and a normal process in the pull-in according to a gap error signal;
a disturbance observer to output a cancellation signal to selectively cancel disturbances contained in the gap error signal by selecting frequency bands according to a level of the gap error signal; and
a controller to control the gap servo control apparatus to output an actuator driving signal using the feedback signal and the cancellation signal to drive a lens of the near-field optical disc drive to record and/or reproduce data on a disc in the near-field optical disc drive.

22. The gap servo control apparatus of claim 21, wherein the disturbance observer comprises:
a first disturbance observer to output a signal using a first band to cancel the disturbances while within a first range of gap error signals; and
a second disturbance observer to output a signal using a second band to cancel the disturbances while within a second range of gap error signals.

23. The gap servo control apparatus of claim 21, wherein the controller controls a switch according to the level of the gap error signal so that the signal output by the disturbance observer corresponds to the level of the gap error signal.

24. The gap servo control apparatus of claim 21, further comprising an approach controller to output a signal for performing an approach process in a pull-in;
wherein the controller controls a switch to output the signal of the approach controller until the gap error signal reaches a first level, and to output the signal of the feedback controller when and after the gap error signal reaches the first level.

25. A gap servo control method in a near-field optical disc drive, the gap servo control method comprising:
selectively cancelling a disturbance of a detected gap error signal by using bands corresponding respectively to a plurality of predetermined levels of the gap error signal; and
generating an actuator driving signal in a transient response process of a gap pull-in according to the plurality of predetermined levels of the gap error signal from which the disturbance is selectively cancelled.

26. The gap servo control method of claim 25, wherein the selectively cancelling of the disturbance further comprises:
adding a signal of a first band within a first range of gap error signals to the gap error signal; and
adding a signal of a second band within a first range of gap error signals to the gap error signal.

* * * * *